Patented Sept. 7, 1954

2,688,608

UNITED STATES PATENT OFFICE 2,688,608

PROCESS FOR COPOLYMERIZING ACRYLONITRILE AND ACRYLATE ESTERS

Harry H. Weinstock, Jr., Madison, N. J., assignor to Allied Chemical & Dye Corporation, New York, N. Y., a corporation of New York No Drawing. Application July 2, 1952,
Serial No. 296,943

9 Claims. (Cl. 260—85.5)

This invention relates to processes for copolymerizing acrylate esters of $C_1$ to $C_9$ saturated, aliphatic, monohydroxy alcohols with acrylonitrile in aqueous, acidic media containing separate monomer phase dispersed in the aqueous phase, i. e. in aqueous emulsions or suspensions, employing hydrogen peroxide, a soluble copper salt and a lower paraffin monoaldehyde to catalyze and to control the polymerization reactions and the character of the polymer produced.

It is known to copolymerize an acrylate ester and acrylonitrile emulsified in water containing any one of numerous emulsifying or dispersion agents or dispersed as a monomer phase in water without such agent present. A large number of catalysts promoting the polymerization reactions are known, among which are the peroxides, per salts and other compounds having similar oxidizing properties. I have discovered that by carrying out these polymerizations of certain acrylate esters with acrylonitrile in the presence of a small amount of copper salt soluble in the aqueous reaction mixture, the reduced viscosity of the resulting polymer may be decreased as compared with polymer made under the same conditions except for no copper salt being present. My copending United States patent application, Serial No. 285,310, filed April 30, 1952, is directed to this control of the polymerization reactions by means of a soluble copper salt.

I have further discovered that by also having a small amount of a lower paraffin monoaldehyde (one containing less than six-preferably no more than four, carbon atoms in the molecule) present in the reaction mixture in which acrylate esters of $C_1$ to $C_9$ saturated, aliphatic, monohydroxy alcohols are copolymerized with acrylonitrile in the presence of hydrdogen peroxide and a soluble copper salt, the polymerization reactions and character of the polymer formed are further modified and important new advantages are obtained.

In copolymerizing methyl acrylate, for example, with acrylonitrile in aqueous emulsion or suspension employing hydrogen peroxide as the catalyst, at temperatures below 60° C. the rate of reaction is very slow even under the catalytic influence of the hydrogen peroxide. In fact, so slow are the reactions at these lower temperatures it is impracticable to employ this procedure commercially to produce methyl acrylate-acrylonitrile polymers at those temperatures. Higher temperatures and relatively large amounts of the hydrogen peroxide catalyst result in speeding up the reaction. But in so doing the danger is present of the reaction periodically taking place at an exceptionally high rate. Since the reaction is exothermic, such an adventitious speeding up of the reaction rate tends to generate excessively high temperatures in the reaction mixture. It is also known that at temperatures above 60° C., in employing hydrogen peroxide to catalyze the copolymerization of these monomers there is generally a prolonged initial induction period prior to the polymerization going forward at a reasonably rapid rate. The addition of copper salt generally increases the length of this induction period.

I have now discovered that by including in the reaction mixture a small amount of a lower paraffin mono-aldehyde in addition to the soluble copper salt, the induction period for the hydrogen peroxide catalyzed copolymerization of the acrylate esters and acrylonitrile is substantially shortened. The reaction rates following this initial induction period are increased, but at the same time are kept more uniform. This means it is less difficult to control the reaction to prevent an excessively high reaction rate and excessive increases in the temperature of the reaction mixture. Further, I have found the presence of the aldehyde does not prevent the copper salt modifying the character of the copolymers produced to decrease their reduced viscosities as compared with copolymers made under the same conditions except for no copper salt being present. I have found, also, that with both the copper salt and the aldehyde present, the variation in reduced viscosities of the polymers formed at different stages of the reaction are substantially reduced. This results in a product of more uniform molecular weight being produced than is obtained with hydrogen peroxide alone or with a copper salt also present. Furthermore, in some cases the presence of the aldehyde results in obtaining even lower viscosity copolymers than are obtained with copper and hydrogen peroxide catalysts in the absence of the aldehyde.

As noted above, at temperatures below 60° C. the hydrogen peroxide catalyzed polymerization of methyl acrylate with acrylonitrile in aqueous media proceeds at a very slow rate. The presence of copper further slows down this reaction rate. With copper present at temperatures of 50° C. or lower, little or no reaction takes place over long periods of time. I have discovered that by additionally incorporating in the reaction mixture a small amount of the lower paraffin mono-aldehyde the combined effect of the hydrogen peroxide, copper and aldehyde is to promote the polymerization reactions and cause them to go at a suitably high speed even at these lower temperatures. In general, the effect of decreasing the temperature at which the copolymerization of the methyl acrylate and acrylonitrile is carried out is to increase the reduced viscosity of the resulting polymer. It is an important advantage of the process of my invention that by having both copper and aldehyde present with the hydrogen peroxide catalyst, the polymerization reactions may be carried out at temperatures below 60° C. at adequate rates to obtain copolymers of relatively uniform molecular weights and the effect of the lower temperatures tending to increase the reduced viscosities is counteracted in large degree by the presence of the copper salt.

My invention, therefore, is directed to new processes for copolymerizing acrylate esters with acrylonitrile dispersed as monomer phase in acidic aqueous media, employing hydrogen peroxide to catalyze the polymerization reactions. The invention is characterized by having present in the reaction mixture a small amount of a copper salt soluble therein and a small amount of a lower paraffin mono-aldehyde containing less than six carbon atoms, preferably no more than four carbon atoms, in the molecule. My invention is applicable to copolymerizing with the acrylonitrile any one or more of the esters of acrylic acid and a $C_1$ to $C_9$ saturated, aliphatic, monohydroxy alcohol (containing one to nine carbon atoms in the molecule) having at least one hydrogen atom on the carbon adjacent the hydroxyl group. Such esters are represented by the formula:

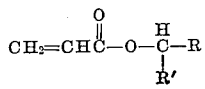

where R and R' represent hydrogen and a saturated alkyl radical.

The polymerization conditions with respect to temperatures at which the reaction mixture is maintained, the amounts of hydrogen peroxide catalyst, monomers and water present, and the kind and amount of dispersing or emulsifying agent present, known to the art as suitable for polymerizing the monomers are suitable for carrying out their polymerization in operating in accordance with my invention. In addition, lower temperatures, below 60° C., are suitable operating temperatures for carrying out the process of my invention.

The amount of copper present may be varied from less than 1 to 32 parts per million or more of reaction mixture. A minimum of 0.2 part per million in the amount of copper present should be employed to obtain high yields of copolymer and a substantial decrease in its reduced viscosity as compared with copolymer prepared in the absence of the copper. On the other hand, for given reaction conditions with respect to hydrogen peroxide content, temperature, etc., there is an upper limit to the amount of copper which may be present without unduly slowing down or inhibiting the polymerization reactions. For example, in polymerizing an aqueous emulsion of methyl acrylate and acrylonitrile in the ratio by weight of 30/70 at 35° C. in the presence of 1% hydrogen peroxide and 1.2% butyraldehyde (both based on amount of monomer present), the polymerization reactions proceeded at a high rate in the presence of 32 parts per million of copper, but with 96 parts per million copper present, at the end of 7½ hours there was little, if any, polymer formed.

The aldehyde present should amount to about 0.5 or more percent by weight of the monomer. For given amounts of hydrogen peroxide and copper salt, as the amount of aldehyde is increased above this lower limit, there is initially little change on the rate of reaction, yields of copolymer and reduced viscosity of the product. With relatively large amounts of aldehyde the principal effects are to slow down the reaction and to decrease the reduced viscosity of the polymer. In order to produce low viscosity polymers, therefore, the larger amounts of the aldehyde are employed with increased reaction time. A large decrease in reduced viscosity of the polymer may be obtained, however, without employing a large enough amount of aldehyde to excessively increase the reaction time required to produce the polymer. From about 0.5% to 10% of aldehyde by weight of the monomer represents a good operating range to attain the objectives of my invention. The use of larger concentrations of aldehyde in the reaction mixture would only be employed under special circumstances.

My invention is applicable to the copolymerization of the acrylate ester and acrylonitrile in widely varying ratios ranging from about 20/80 to about 60/40 parts by weight methyl acrylate/acrylonitrile. In making up the reaction mixtures by dispersing the monomers in water, no addition of acid is necessary to have the reaction mixture acidic. Suitable acidities are generated by the monomers themselves in contact with water, so long as sufficient alkaline material to raise the pH of the mixture to 7 or higher is not added.

The aldehydes which are employed in carrying out my invention are the paraffin monoaldehydes containing less than six, preferably one to four, carbon atoms in the molecule. These are the straight chain aldehydes, formaldehyde, acetaldehyde and propionaldehyde, and the straight and branched chain higher aldehydes n- and iso-butyraldehyde, n- and iso-valeraldehyde, methyl-ethyl-acetaldehyde and trimethyl acetaldehyde. These several aldehydes do not all have the same effect in modifying the polymerization and properties of the resulting polymer. For example, formaldehyde, acetaldehyde and n-butyraldehyde have similar action in decreasing the induction time and reaction time required to obtain high yields of the polymer. With propionaldehyde and the same total time a lower polymer yield is obtained in approximately the same time. Thus, whereas yields with the first three aldehydes ranged from 88% to 94% of a methyl acrylate-acrylonitrile copolymer, with propionaldehyde under like conditions the yield was 69%. Again, n-butyraldehyde generally induces a greater decrease in the reduced viscosity of the polymer than the other aldehydes under similar conditions. Accordingly, for carrying out the process of my invention I prefer to employ the saturated, aliphatic monoaldehydes containing no more than 4 carbon atoms, all in a single straight chain, with the carbon atom of the aldehyde radical being an end atom of the carbon chain, especially n-butyraldehyde.

My invention will be further described and illustrated by the following examples. Unless otherwise stated, in these examples the amounts of materials are given in parts by weight. Polymer yields are given in percent yield of polymer based on the weight of monomers initially added to the reaction mixture. The reduced viscosities given in these examples and referred to throughout this application are determined for a solution of 0.125 gram of the polymer per 100 cc. of solution of the polymer in dimethyl formamide, employing Ostwald-Fenski tubes. The numerical values for the reduced viscosities are calculated using the equation:

$$\text{Reduced viscosity} = \frac{\text{Time of efflux of solution} - \text{Time of efflux of solvent}}{0.125 \times \text{Time of efflux of solvent}}$$

Solution viscosities are given in centipoises for solutions at about 25° C., measured by a Brookfield viscosimeter.

*Example 1.*—Forty parts of methyl acrylate and 60 parts of acrylonitrile are dispersed in an aqueous solution of 1.6 parts of a sodium salt of a sulfated, substituted amide of oleic acid dispersing agent (known by its trade name "Igepon T") in 450 parts of distilled water. This mixture is heated to 70° C. and about 3.5 parts of a 30% hydrogen peroxide solution are added. There is also added 0.00216 part of copper sulfate pentahydrate and 0.5 part by weight of formaldehyde. This reaction mixture is agitated and maintained at 70° C. Following an induction period (about 8 minutes) polymerization of the methyl acrylate and acrylonitrile takes place and agitation of the reaction mixture while maintaining it at 70° C. is continued for a reaction time of about three hours. At the end of this period the reaction mixture is cooled to freeze it, is then thawed and the coagulated, solid polymer is filtered from the mother liquor. The polymer is washed with water and then with methanol and is dried.

Polymer was thus prepared with a total time of 3 hours and 8 minutes from addition of the hydrogen peroxide, copper sulfate and formaldehyde. It was obtained in 96% yield and had a reduced viscosity of 3.0. A 15% by weight solution of this polymer in acetonitrile had a viscosity of 17,600 cps. The reaction mixture in this example contained 1% hydrogen peroxide and 0.5% formaldehyde based on the weight of monomers used and 1.0 part per million of copper based on the total reaction mixture.

In contrast to the foregoing example embodying my invention, when methyl acrylate and acrylonitrile were copolymerized under the same conditions except no copper or formaldehyde was added to the reaction mixture, the induction period was 30 minutes. This was followed by a reaction period of 4½ hours (total time 5 hours) to give an 84% yield of polymer having a reduced viscosity of 6.1. A 12% solution of this polymer in acetonitrile had a viscosity of 102,000 cps. By incorporating 1 part per million copper in the reaction mixture (no formaldehyde being added), following an induction period of two hours and 30 minutes and 4 hours reaction time (total time 6 hours and 30 minutes), an 89% yield of polymer was obtained having a reduced viscosity of 1.9 and its solution in acetonitrile at 15% concentration had a viscosity of 1400 cps. While the reduced viscosity of this polymer was substantially less than the polymer prepared by the process in which no formaldehyde was present, by employing formaldehyde in accordance with my invention a large decrease in reduced viscosity of the polymer was obtained by having the copper present while higher yields of polymer were obtained in only about half the time required in the absence of the aldehyde. The aldehyde was particularly effective in reducing the induction period from 2½ hours to only 8 minutes.

*Example 2.*—Sixty parts methyl acrylate and 140 parts acrylonitrile are dispersed in an aqueous solution of 1.6 parts of the emulsifying agent used in Example 1 in 900 parts of distilled water. This mixture is heated to 35° C. and 0.0043 part copper sulfate pentahydrate, 7.0 parts of 30% hydrogen peroxide solution and 2.93 parts of n-butyraldehyde are added. The agitation is continued with the temperature being maintained at 35° C. In operating in this manner following an induction period of 2 hours and 20 minutes and a reaction time of 4 hours (total time 6 hours and 20 minutes), a 92% yield of polymer having a reduced viscosity of 3.64 was obtained. A 15% solution of the polymer in acetonitrile had a viscosity of 44,500 cps.

When the above procedure of this example was duplicated except that no butyraldehyde was added to the reaction mixture, at the end of 22 hours no polymer was formed.

In carrying out the procedure of this example 1.0% hydrogen peroxide and 1.2% butyraldehyde (based on the monomers) and 1 part per million copper were employed in making up the reaction mixture. With the hydrogen peroxide decreased to 0.2% a 95% yield of polymer was obtained after a total time of 22 hours. This polymer had a reduced viscosity of 3.6. Increasing the hydrogen peroxide to 6%, a 95% yield of polymer having a reduced viscosity of 3.2 was obtained after a total time of 6 hours and 30 minutes. By operating under the conditions given for this example, but increasing the butyraldehyde employed to 9.6%, an 83% yield of polymer having a reduced viscosity of 1.39 was obtained after a total time of 22 hours and 15 minutes.

To illustrate the effect of changing the copper concentration in carrying out the process of this example, with 0.2 part per million copper, a 95% yield of polymer having a reduced viscosity of 4.8 was obtained after a total time of 21 hours at 35° C. With the copper increased to 32 parts per million, a 96% yield of polymer having a reduced viscosity of 2.1 was obtained after a total time of 6 hours at that same temperature.

*Example 3.*—Methyl acrylate and acrylonitrile in the weight ratio of 40/60 were polymerized by the procedure of Example 2 above except that 0.00155 gram of cuprous cyanide was added to the reaction mixture in place of the copper sulfate pentahydrate and the reaction mixture was maintained at 70° C. Following an induction period of 25 minutes and a reaction period of 2 hours at this temperature, a 98% yield of polymer having a reduced viscosity of 0.94 was obtained. By a similar procedure except for omission of the butyraldehyde, an 85% yield of copolymer having a reduced viscosity of 2.0 was obtained following 165 minutes induction period and 3 hours reaction period.

*Example 4.*—The following table shows the reduced viscosities of polymers obtained during the course of the polymerization reactions in polymerizing various mixtures of methyl acrylate and acrylonitrile in aqueous emulsion employing 1% hydrogen peroxide, with and without copper and butyraldehyde present in amounts of 1 part per million copper and 1.2% butyraldehyde, the hydrogen peroxide and butyraldehyde percentages being based on the weight of monomers incorporated in the reaction mixture.

| Ratio, MA/AN | Additives | Temperature, °C | Reduced Viscosity at increasing amounts of Polymerization | | | | |
|---|---|---|---|---|---|---|---|
| | | | 10% | 20% | 40% | 60% | Final [1] |
| 40/60 | None | 70 | 7.5 | 9.1 | 9.6 | 8.5 | 6.5 (77%) |
| 40/60 | $CuSO_4$ | 70 | 0.4 | 0.9 | 1.5 | 1.9 | 2.0 (73%) |
| 50/50 | $CuSO_4$+ald | 70 | 0.6 | 0.7 | 0.8 | 0.7 | 0.7 (93%) |
| 50/50 | CuCN+ald | 70 | 1.3 | 1.1 | 1.1 | 1.1 | 1.0 (94%) |
| 30/70 | $CuSO_4$+ald | 35 | 4.2 | 4.8 | 5.1 | 4.5 | 3.8 (88%) |

[1] The percent values in this column are the percent yield of polymer having the noted final reduced viscosity.

NOTE:—In the column headed "Additives," "ald." indicates the addition of 1.2% n-butyraldehyde in addition to the copper salt.

In the above table it may be noted that for 70° C. reaction temperature, as the polymerization reaction proceeded in the absence of both copper and aldehyde the reduced viscosities of the polymer varied over a range of 3.1 units. With the copper salt present that range was decreased to 1.6 units. With the additional presence of the aldehyde, operating in accordance with my invention, this range was decreased to 0.3–0.2 unit. At 35° C. reaction temperature the range of reduced viscosities as the polymerization reaction progressed was held within 1.3 units.

*Example 5.*—Forty-five parts n-octyl acrylate and 55 parts acrylonitrile are dispersed in an aqueous solution of 2 parts of a dispersing composition known by its trade name "Aerosol OT," reported as being dioctyl ester of sodium sulfosuccinic acid, in 450 parts of distilled water. The mixture is heated to 65° C. and 0.00216 part copper sulfate pentahydrate, 1.2 parts n-butyraldehyde and 3.5 parts of a 30% aqueous hydrogen peroxide solution are added. This reaction mixture is agitated and maintained at 65° C. Following an induction period of 50–60 minutes, polymerization takes place and at the end of a 5.5 hour reaction period (about 6.5 hours total time following addition of the hydrogen peroxide) the reaction mixture is cooled. The copolymer formed is recovered and purified as described in Example 1.

Polymer thus prepared was obtained in 93% yield and had a reduced viscosity of 2.1. Employing the same procedure except for omitting the butyraldehyde from the reaction mixture, substantially the same yield of copolymer was obtained following a total induction and reaction period of 5½ hours but the reduced viscosity of the copolymer was 4.6. With neither butyraldehyde nor the copper salt present in the reaction mixture, a lower yield of polymer (81% after about 5¾ hours following the hydrogen peroxide addition) was obtained and the reduced viscosity of the product was 6.3.

*Example 6.*—Forty parts of 2-ethyl hexyl acrylate and 60 parts acrylonitrile are dispersed in an aqueous solution of 1.6 parts of the dispersing agent of Example 1 ("Igepon T") in 450 parts distilled water. Copper sulfate pentahydrate amounting to 0.00108 part, n-butyraldehyde amounting to 1.2 parts, and 3.5 parts of a 30% solution of hydrogen peroxide are added to the mixture which has been heated to 50° C. This reaction mixture is agitated and maintained at 50° C. for about six hours. The copolymer formed is recovered by the procedure described in Example 1.

In operating in accordance with this example, an 88% yield copolymer having a reduced viscosity of 1.8 was obtained.

The polymers prepared employing the processes of my invention are particularly useful in the production of films by casting solutions of the polymers in solvents such as acetonitrile. The polymers are not limited to this use, however, but may be made into fibers or other forms.

Both theoretical considerations and experimental evidence indicate that many of the mechanical properties of polymers are improved by increasing the homogeneity of the polymer compositions with respect to molecular weight of the different polymer molecules. Reduced viscosity is a measure of the relative average molecular weight of different polymer samples, the higher the reduced viscosity the greater the average molecular weight of the polymer making up that sample. Accordingly, the smaller the range in reduced viscosities of the polymer at different stages of the reaction the more uniform is the average size of the molecules making up that polymer. The conjoint use of a soluble copper salt and aldehyde in copolymerizing an acrylate ester with acrylonitrile in accordance with my invention increases the homogeneity of the polymer products and is an important advantage of my invention.

I claim:

1. In copolymerizing acrylonitrile with an ester of acrylic acid and a $C_1$ to $C_9$, saturated, aliphatic, monohydroxy alcohol having at least one hydrogen atom on the carbon atom adjacent the hydroxyl group, in the monomer ratio of 20/80 to 60/40 parts by weight ester/acrylonitrile, dispersed in an aqueous acidic medium containing separate monomer and aqueous phases, and in the presence of hydrogen peroxide and a copper salt soluble in the aqueous reaction mixture, said hydrogen peroxide and copper salt being present in amounts effective to catalyze and control the polymerization reactions, that improvement which comprises incorporating in said reaction mixture at least about 0.5% and no more than a minor amount (by weight of the monomer present) of a paraffin monoaldehyde containing less than 6 carbon atoms in the molecule.

2. The process of claim 1 in which the aldehyde is one containing no more than 4 carbon atoms, all in a single straight chain, with the carbon atom of the aldehyde radical being an end atom of the carbon chain.

3. The process of claim 1 in which the aldehyde is n-butyraldehyde.

4. The process of claim 1 in which methyl acrylate and acrylonitrile are copolymerized in the monomer ratio of 20/80 to 60/40 parts by weight methyl acrylate/acrylonitrile.

5. The process of claim 1 in which the aqueous reaction mixture contains about 0.5% to about 10% (by weight of the monomers) of the aldehyde and not substantially more than about 32 parts per million (by weight of the total reaction mixture) of copper in the form of the soluble copper salt.

6. The process of claim 2 in which the reaction mixture contains about 0.5% to about 10% (by weight of the monomers) of aldehyde and not substantially more than about 32 parts per million copper (by weight of the total reaction mixture).

7. The process of claim 2 in which methyl acrylate and acrylonitrile are copolymerized in the monomer ratio of 20/80 to 60/40 parts by weight methyl acrylate/acrylonitrile.

8. The process of claim 4 in which the aqueous reaction mixture contains about 0.5% to about 10% (by weight of the monomers) of the aldehyde and not substantially more than about 32 parts per million (by weight of the total reaction mixture) of copper in the form of the soluble copper salt.

9. The process of claim 5 in which the reaction mixture is maintained at temperatures below 60° C. during the polymerization of the monomers.

References Cited in the file of this patent

UNITED STATES PATENTS

| Number | Name | Date |
|---|---|---|
| 2,380,476 | Stewart | July 31, 1945 |
| 2,434,054 | Roedel | Jan. 6, 1948 |

OTHER REFERENCES

Schildknecht—Vinyl and Related Polymers (1952) page 285.